United States Patent [19]
Kikinis et al.

[11] Patent Number: 5,528,480
[45] Date of Patent: Jun. 18, 1996

[54] HIGHLY EFFICIENT RECTIFYING AND CONVERTING CIRCUIT FOR COMPUTER POWER SUPPLIES

[75] Inventors: Dan Kikinis, Saratoga; Thomas Lo, Cupertino, both of Calif.

[73] Assignee: Elonex Technologies, Inc., San Mateo, Calif.

[21] Appl. No.: 234,301

[22] Filed: Apr. 28, 1994

[51] Int. Cl.$^6$ ................................................. H02M 3/155
[52] U.S. Cl. ............................. 363/15; 363/89; 363/127
[58] Field of Search ........................... 363/15, 74, 78, 363/81, 84, 89, 101, 125, 127, 131, 21; 323/259, 344

[56] References Cited

U.S. PATENT DOCUMENTS

| | | | |
|---|---|---|---|
| 5,132,606 | 7/1992 | Herbert | 323/266 |
| 5,406,468 | 4/1995 | Booth | 363/21 |
| 5,410,467 | 4/1995 | Smith et al. | 363/131 |
| 5,414,341 | 5/1995 | Brown | 323/268 |

*Primary Examiner*—Peter S. Wong
*Assistant Examiner*—Adolf Berhane
*Attorney, Agent, or Firm*—Donald R. Boys

[57] ABSTRACT

A power supply for producing a regulated dc output from an ac primary input incorporates a convention rectifying and filtering circuitry feeding a switching circuit for providing a high frequency, substantially rectangular voltage waveform to a high frequency transformer. The output of the transformer is provided to a synchronous buck converter having a grounded line and an ungrounded line, with a first FET switch in the ungrounded line and a second FET switch connected from the output of the first FET switch to the grounded line. A controller in the synchronous buck converter switches the FETs according to the input voltage waveform to achieve rectification. In another aspect, two FETs are placed in opposite polarity in the ungrounded line and switched together, and the controller also alters the duty cycle of the switching in accordance with the magnitude of a regulated output produced from the output of the synchronous buck converter, to achieve precise regulation. Power supplies are provided with multiple outputs of different regulated voltage, which may be externally enabled and disabled.

16 Claims, 7 Drawing Sheets

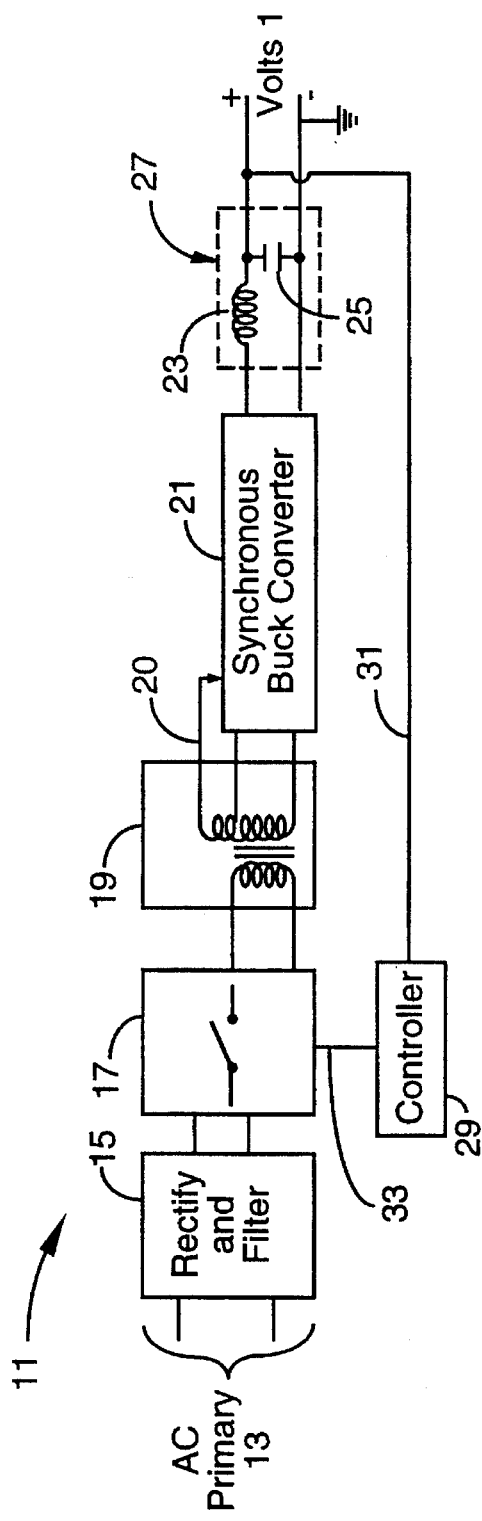
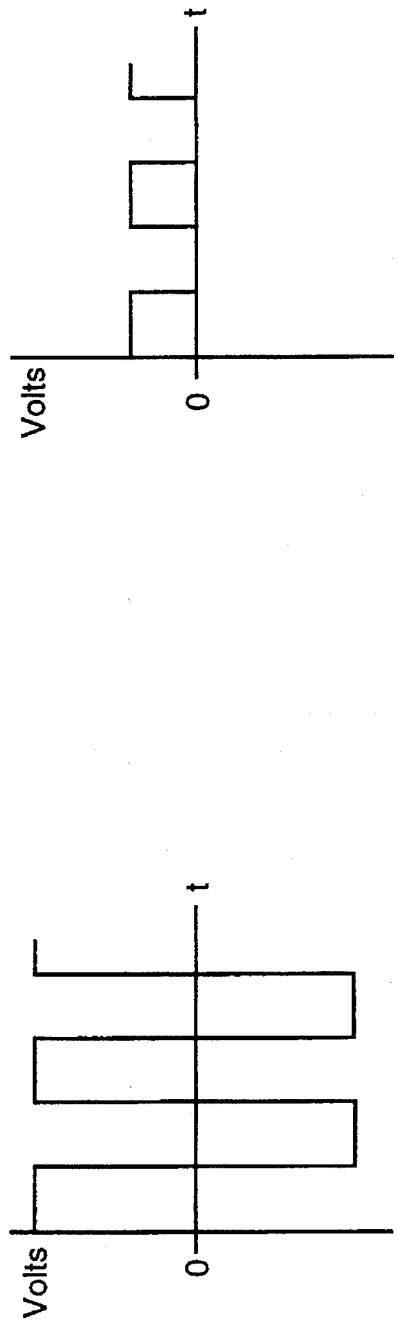
FIG. 1
FIG. 2A - Primary
FIG. 2B - Secondary

HIGHLY EFFICIENT RECTIFYING AND CONVERTING CIRCUIT FOR COMPUTER POWER SUPPLIES

FIELD OF THE INVENTION

The present invention is in the area of switching power supplies for converting primary ac power to one or more controlled dc outputs, and has particular application to general-purpose computer systems.

BACKGROUND OF THE INVENTION

Electrical system, such as general-purpose computer systems, typically include power supplies for accepting primary power, such as the 120 v, 60 Hz primary system in use in the United States, and for providing power in other forms as needed by specific systems. Often the systems, such as computers, require power at several different voltages and as direct current (dc) rather than the primary alternating current (ac). In general, it is desirable for a power supply to operate with maximum efficiency so the least amount of power provided is lost in the conversion process.

An efficient power supply will transfer power to its load with a minimum of losses. This saves on power costs by minimizing the amount of power needed to operate the system or equipment.

As described above, a computer system needs power to drive several subsystems, not all of which use the same voltage. For example, most computers use 5 v dc or 3.3 v dc for operating solid-state circuitry, such as a CPU microprocessor, while 12 v dc may be required for motors to drive disk storage systems. Ideally, a computer should only consume the amount of power that is needed to service its necessary functions. In practice, however, some power is wasted in the power supply, and the efficiency is less than 100% Wasted power usually degrades to heat in the power supply components. The waste heat must be dissipated, or the temperature of the components will rise to a temperature sufficient to damage components, or at least to reduce functionality.

A significant source of power loss in a power supply for a computer system is the process for converting the input primary ac line voltage into regulated dc output voltages. Part of the problem is the combination of relatively high voltage and relatively low frequency in the input line (120 v, 60 Hz in the United States).

In a general-purpose computer, the output voltages required are typically at or below 12 V dc., so the higher input line voltage must be lowered significantly. The voltage reduction is typically accomplished through a transformer. Transformers come in a wide variety of sizes, and a transformer's efficiency depends, among other things, on the frequency of the input line voltage, which operates on the transformer's primary winding. In general, for a higher input frequency, a smaller transformer may be used. Furthermore, due to size constraints in a computer system, a small transformer size is desirable. The low frequency of the input (60 Hz), indicating a large transformer, is therefore a problem.

The conventional method to deal with the problem of low input frequency is to increase the frequency of the input line voltage before providing the input to the transformer. The first step in this process typically is to convert the input ac line voltage into an unregulated dc voltage. This process is called rectification and filtering, and is well known. There are many ways known in the art for accomplishing rectification and filtering.

In the conventional case, the unregulated dc voltage is sampled through a switch in order to increase the frequency. That is, the unregulated dc voltage is chopped into a higher frequency. This is also a well known process, and there are many ways of accomplishing it. Finally, the chopped dc voltage waveform is input into the primary winding of a small high-frequency transformer to complete the step-down process.

The voltage step-down process described above for the conventional case requires the input ac line voltage to be first converted to dc then back to ac before actually being stepped down by a transformer. This ac to dc to ac process is common to most computer system power supplies. There are small losses associated With each of the conversion steps, but this step-down stage of the power supply can be designed to be relatively efficient.

The stepped-down, chopped (ac) waveform from the secondary of the transformer must still be converted into a regulated dc voltage for use by the computer system. An often-used, conventional way that has been used to accomplish this regulation stage of the power supply is with regulation of the input. Firstly, the ac waveform from the secondary is rectified by feeding it through diodes, which have a low resistance to current in one direction, and a high resistance in the opposite direction. Secondly, the output from these diodes is filtered to produce a dc voltage. The filtered dc is the output, which is sampled and fed back to control the duty cycle of the switch used to chop the rectified and filtered ac input line voltage. This process regulates the output dc voltage by controlling the amount of energy that is transferred or coupled through the transformer.

In this conventional method, there is a fixed voltage drop across the diodes. If the required output voltage is low enough, such as 5 V, this fixed voltage drop across the diodes, about 0.7 V to 1 V for a standard P-N junction diode, is a significant percentage of the output voltage. This results in power being dissipated across the diodes, which degrades the efficiency of the power supply.

The diode voltage drop can be minimized through by using Schottky diodes, decreasing the voltage drop to about 0.3 V to 0.7 V, but Schottky diodes are significantly more expensive than standard P-N junction diodes, which increases the cost of the power supply. In general, power supplies following this conventional approach exhibit overall efficiency in the 50% to 75% range.

The fact that power dissipated across the diodes is degraded to heat, further compounds the difficulty. The fact of heat production in the diode circuitry requires the diode arrangement be in a discrete package wherein heat may be controlled, and precludes use of integrated circuit technology in the diode package.

Another disadvantage of regulating the input to create a regulated dc output voltage is that only one voltage level can be regulated with precision. This fact is especially significant in a computer system that requires multiple regulated output dc voltages.

One way manufacturers have dealt with the inability to precisely control more than one output is by running separate switching regulators off one tightly regulated dc output voltage level to provide the multiple output voltages. This design is called the power rail concept. Switching regulators are also known as dc to dc converters, and exploit the relationship between the electrical and magnetic fields in order to regulate voltages. These switching regulators are more efficient than comparable-pass transistor voltage regulators, and one common type of switching regulator used by manufacturers is called a buck converter.

The power rail method deals with the multiple output precision difficulty, but still suffers from inefficiency caused by the rectification diodes used to create the power rail. Furthermore, the power rail is normally regulated at a higher voltage than is needed by any supplied subsystem, and the higher voltage serves as a reference voltage for the dc to dc converters. This incurs a cost penalty, as a separate dc to dc converter is needed for each output voltage.

What is clearly needed is a power supply architecture that avoids the losses created by rectification diodes in the regulation stage, and also allows for implementation of multiple, precisely regulated dc output voltages of differing values without using costly power rail. Avoiding the diode losses increases efficiency of the power supply without requiring costly Schottky diodes and allows most of the power supply elements to be implemented as solid-state devices in silicon.

SUMMARY OF THE INVENTION

A power supply is provided according to an embodiment of the invention for creating a regulated dc output from an ac primary. The power supply comprises rectifying and filtering circuitry connected to the ac primary for producing an unregulated dc voltage, and an externally adjustable input switching circuitry connected to the output of the rectifying and filtering circuitry, configured to provide a substantially rectangular waveform ac output across two output lines of the switching circuitry at a higher frequency than the input frequency. The substantially rectangular ac voltage waveform is input to a step-down transformer with a primary winding connected to the two output lines of the switching circuitry and a secondary winding having one grounded leg. The transformer substantially reproduces the rectangular waveform from the input switching circuitry across the grounded leg and a first output tap of the transformer, at a lower voltage than the input waveform.

A unique synchronous buck converter having first and second input lines connected to the grounded leg and the first output tap of the transformer rectifies the substantially rectangular waveform of the transformer secondary. The synchronous buck converter comprises a first FET connected to switch the line from the first output tap, a second FET connected from the output of the first FET to the grounded leg, and a first controller connected to the switching input of each FET and to a second output tap of the transformer at a higher voltage than the first output tap. The controller is configured to switch the FETs on and off synchronously with the substantially rectangular waveform, the first FET on substantially during the time the voltage in the waveform is maximum, and off during the time the voltage is minimum. The second FET is switched on and off opposite the state of the first FET.

A storage and filter circuit is connected to the grounded and ungrounded sides of the second FET, having an inductor in the line from the ungrounded side and a capacitor connected across the grounded and ungrounded sides, and providing the regulated dc output measured from the output of the inductor to the grounded side of the capacitor. A second controller connected to the output of the inductor and to the externally adjustable input switching circuitry adjusts the duty cycle of the input switching circuitry according to variation of the voltage magnitude of the regulated dc output, to precisely regulate the dc output of the power supply.

The unique synchronous buck converter in combination with the other elements of the power supply provides a supply with efficiency heretofore unattainable. The FETs have a very low resistance to current in the on state, and therefore dissipate power as heat to a lesser degree than do the diode arrangements in conventional switching power supplies.

In a refinement of the present invention, the input side to the transformer is self regulating, and the synchronous buck converter has two FETs in line, and in opposite polarity, in the ungrounded output line from the transformer. In this configuration, the inline FETs are switched together, and the switching duty cycle is altered by the controller in the synchronous buck converter in response to sensing the regulated output of the power supply to achieve regulation. This refinement renders the secondary side of the power supply independent of the primary side for regulation, and allows multiple regulated dc outputs to be provided from a single input side and transformer, by connecting sets of synchronous buck converters and storage and filter circuits in parallel from a single transformer.

In the multiple output mode, in a further refinement, on-off inputs to the controllers in the synchronous buck converters allows individual ones of the regulated outputs to be enabled and disabled.

The power supplies according to various embodiments of the present invention enjoy efficiency higher than conventional switching power supplies to the extent that the relative absence of heat generation under load allows for implementing the synchronous buck converters and the input-side circuitry in silicon. There are various options for such IC implementation, from chip sets to single ASICs.

BRIEF DESCRIPTION OF THE DRAWINGS

FIG. 1 is a block diagram of a high-efficiency power supply according to an embodiment of the present invention, producing a single output voltage, volts1.

FIG. 2A shows an example of a voltage waveform on the primary winding of a transformer used in the power supply of FIG. 1.

FIG. 2B shows an example of a voltage waveform on the secondary winding of the transformer used in the power supply of FIG. 1.

DESCRIPTION OF THE PREFERRED EMBODIMENTS

Figure 3:
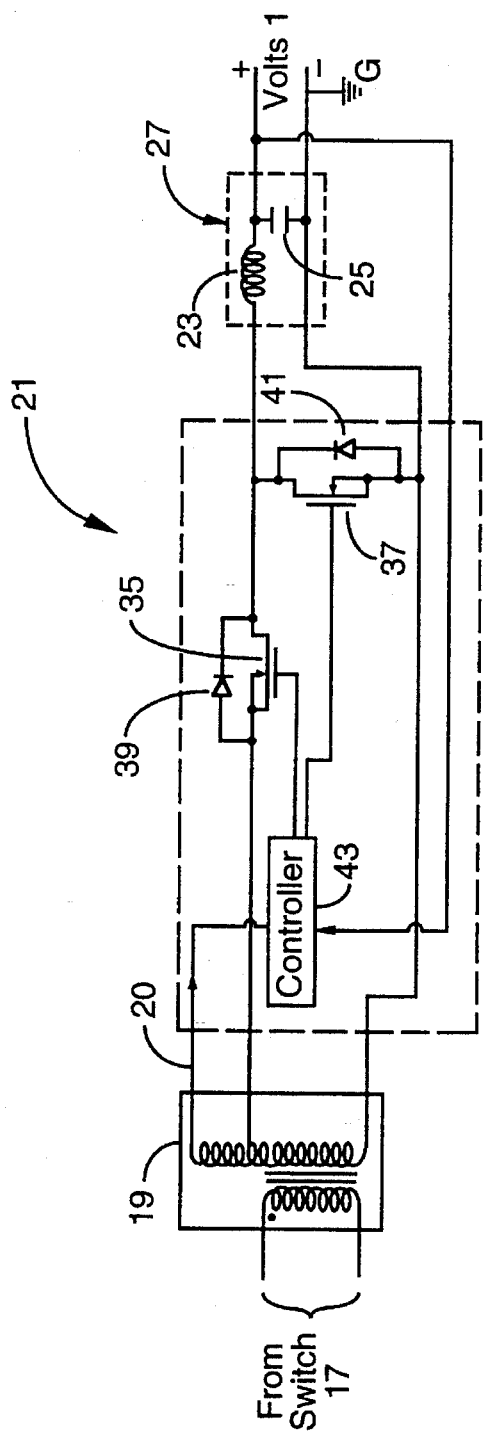
FIG. 3 is a schematic of the regulation stage of a power supply according to an embodiment of the invention having a synchronous buck converter.

In embodiments of the present invention, power supply efficiency is increased by employing a regulation stage architecture that produces precisely regulated dc outputs while avoiding power loss due to fixed voltage drops associated with diodes. In alternative embodiments described below, the architecture is extended to allow for precise and efficient regulation of multiple outputs of differing dc voltages.

FIG. 1 is a block diagram of a high efficiency power supply 11 according to an embodiment of the present invention. Rectifying and filtering circuitry 15, switching circuitry 17, transformer 19, and controller 29 cooperate to step down ac line voltage input 13. Synchronous buck converter 21, storage and filter circuit 27, and controller 29, comprise the regulation stage, which regulates dc output voltage volts1.

In the power supply of FIG. 1, ac line voltage input 13 is fed into rectifying and filtering circuitry 15. Circuitry 15 produces an unregulated dc voltage at its output. The unregulated dc voltage is fed into switching circuit 17, which chops the unregulated dc output of circuitry 15 into a higher frequency, usually 100 kHz or higher. The chopped output from switch 17 is then provided to the primary winding of high-frequency transformer 19. The secondary winding of transformer 19 reproduces the input ac waveform at lower voltage. The output of transformer 19 completes the step-down stage of the power supply.

Switch 17 and transformer 19 represent a forward design architecture. Forward design architecture is used in this embodiment because it is known to provide relatively high efficiency, which contributes to overall power supply efficiency. In forward design architecture, the polarities of the primary and secondary windings of transformer 19 are the same, and the current through switch 17, controlled by controller 29, is regulated to produce an ac pulse train voltage in the primary of transformer 19. This allows transformer 19 to be used just for voltage conversion. A stepped-down version of the ac waveform to transformer 19 is reproduced in the secondary, keeping core losses small. Forward design architecture has an efficiency typically from 90% to 95% for that portion of the power supply to which it applies.

FIG. 2A illustrates an ac waveform on the primary winding of transformer 19, and FIG. 2B shows the waveform of FIG. 2A reproduced on the secondary winding of transformer 19. One side of the secondary winding of transformer 19 is connected to ground, which offsets the waveform in FIG. 2B above ground potential.

The ac waveform from the secondary winding of transformer 19 is provided to synchronous buck converter 21. Feedforward path 20 is from a higher winding tap (higher voltage) on the secondary winding of transformer 19, and is needed for proper operation and synchronization of synchronous buck converter 21. Synchronous buck converter 21 is differentiated in part from a conventional buck converter in that the input voltage supplied to the synchronous buck converter is an ac voltage not a dc voltage.

Volts1 output of the power supply of FIG. 1 is regulated through a feedback loop consisting of synchronous buck converter 21, storage and filter circuit 27, controller 29, and feedback paths 31 and 33. The output of synchronous buck converter 21 is fed into storage and filter circuit 27.

Storage and filter circuit 27 comprises a storage inductor 23 and a filtering capacitor 25 in this embodiment. Voltage volts1, which is a dc output, is provided by storage and filter circuit 27 to be distributed to computer elements requiring the particular dc voltage of volts1.

Output volts1 is sampled by controller 29 through feedback path 31. Controller 29, as described above, regulates the duty cycle of switch 17, which controls the amount of energy coupled to synchronous buck converter 21 through transformer 19, completing the feedback loop. The duty cycle of switch 17 is instrumental in determining the magnitude of output volts1.

FIG. 3 is a schematic of synchronous buck converter 21 connected to transformer 19 and storage and filter circuit 27 in this embodiment. Synchronous buck converter 21 consists of field effect transistor (FET) switches 35 and 37. FET 35 is arranged in-line with the ungrounded output leg of transformer 19, and FET 37 is arranged across the two output legs of the transformer, connecting to the ungrounded leg with FET 35 between the point of connection and the transformer. There are parasitic diodes 39 and 41 associated with each of the FETs, as is common, for these devices A controller 43 is provided within the synchronous buck converter for switching the FETs at appropriate times to achieve rectification of the ac output of the transformer.

Synchronous buck converter 21 uses no diodes to achieve rectification of the ac waveform from the secondary of transformer 19 or to regulate volts1. Switches 35 and 37 are controlled synchronously with the transformer output waveform to achieve rectification, and provide a conductive path of very low resistance. Resistance of such FET switches is typically about 20 milliohm or less.

Synchronous Buck Converter 21 operates as follows: Energy provided by the secondary of transformer 19 is fed through switch 35 into inductor 23 for storage. Capacitor 25 provides a smoothing function. Switch 35 acts as a synchronous rectifier, allowing energy to pass in one direction from transformer 19 into inductor 23. Switch 35 is synchronized with the positive cycle of the output pulse train from the transformer. Synchronization is accomplished with feedforward line 20 from a higher winding tap on the secondary of transformer 19 as an input into controller 43.

Besides synchronization, feedforward line 20 also provides the higher voltage to controller 43 necessary for full turn-on of switches 35 and 37, and the voltage waveform on line 20 follows the duty cycle of switch 17.

Variation in voltage level of volts1 is accomplished by the combination of switches 35 and 37 performing the function of a buck converter. Thus, with only two switches 35 and 37, two functions are performed, these being synchronous rectification and buck conversion.

Controller 43 sequences switches 35 and 37 to provide for proper regulation of volts1 according to the duty cycle of switch 17 controlled by controller 29 (FIG. 1). The cycle of switch 35 is alternated with switch 37. When one switch is on, the other is off. This synchronization is accomplished according to the waveform on feedforward line 20. Alternating the state of switches 35 and 37 keeps current flowing through storage inductor 23, allowing for selective energy storage and regulation of the output voltage.

Both switches 35 and 37 cannot be on at the same time because energy from transformer 19 would be shunted to ground. So, in practice, a small time delay is imposed between one switch going off and the other coming on.

Figure 4:
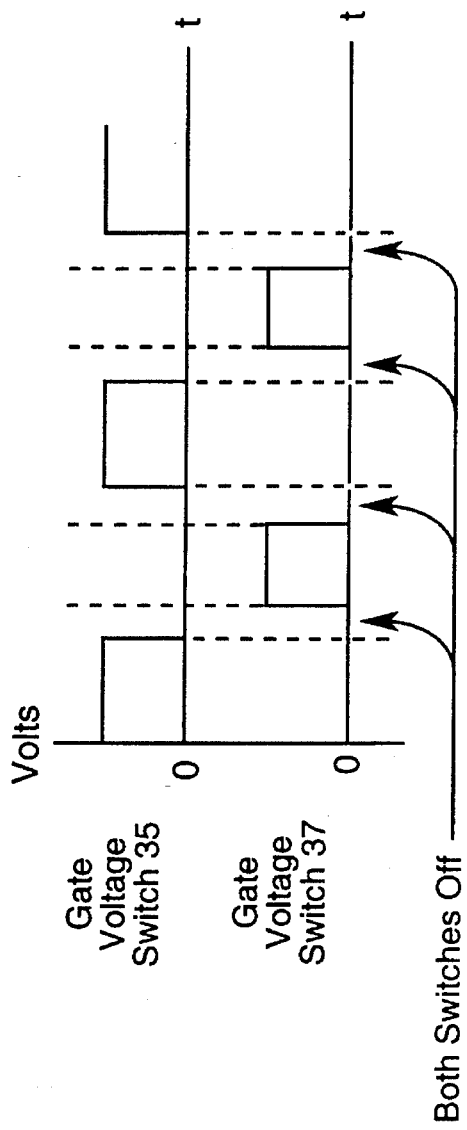
FIG. 4 is an illustration of gating voltages to FET switches used in the synchronous buck converter of FIG. 3.

FIG. 4 illustrates gate voltages to switches 35 and 37 in one example. During the small period where both switches are off, parasitic diode 41 keeps current flowing through inductor 23 and capacitor 25.

In a preferred embodiment, switches 35 and 37 and controller 43 are fabricated on a single IC chip, providing benefits of small component size, count, and low cost. Low power dissipation by switches 35 and 37 due to their low resistance while in the on (closed) state makes their integration with controller 43 in a single IC package practical.

Full voltage regulation is accomplished by the feedback loop depicted in FIG. 1, wherein volts1 is sampled back to controller 29 through feedback path 31. Controller 29 through feedback path 33 controls the duty cycle of switch 17 according to the voltage sample. The duty cycle of switch 17 controls the amount of energy coupled through transformer 19 to synchronous buck converter 21 by regulating the duty cycle of the voltage pulse train at the primary of transformer 19.

Figure 5A:
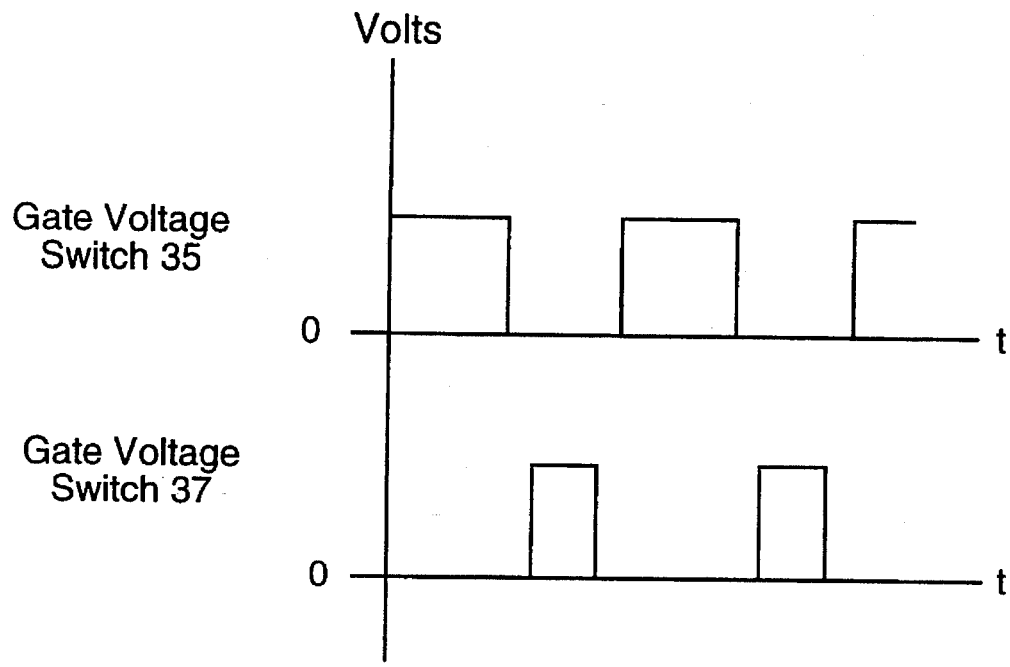
FIG. 5A shows an example of gating voltages of one duty cycle to the FET switches used in a synchronous buck converter in an embodiment of the invention.
Figure 5B:
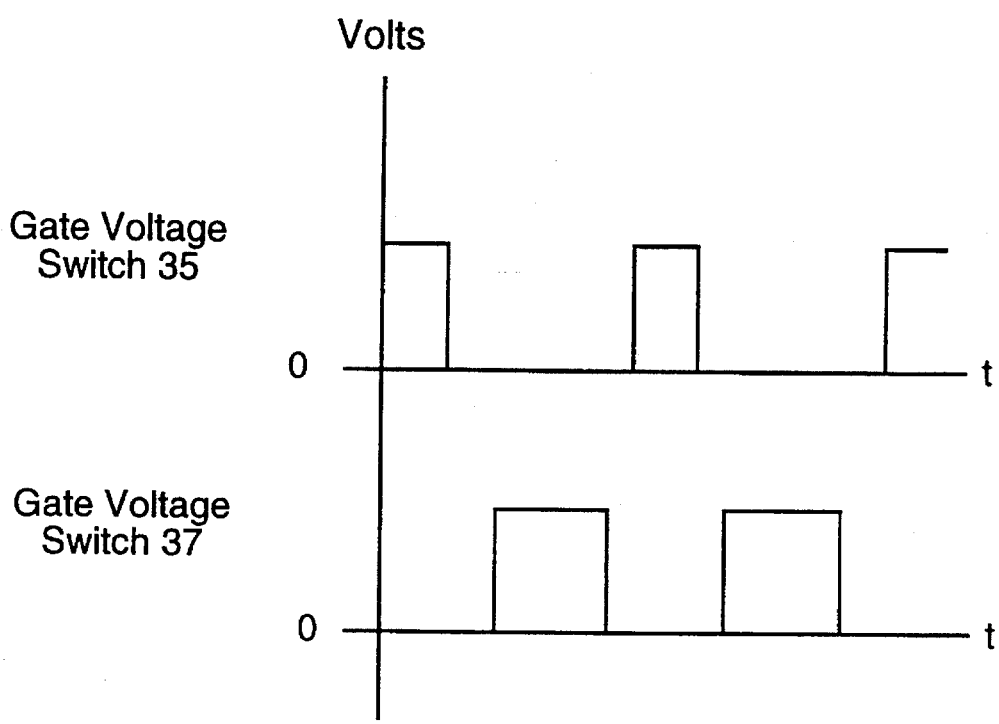
FIG. 5B shows an example of gating voltages of another duty cycle than the duty cycle shown in FIG. 5A.

FIG. 5A is an illustration of the gate voltages to switches 35 and 37 at one duty cycle, and FIG. 5B is an illustration of the gate voltages to the switches at another duty cycle. FIG. 5A shows a situation where more energy is transferred to inductor 23 through switch 35 being on than in FIG. 5B. The duty cycle of switch 17, adjusted by controller 29 according to variation in the magnitude of volts1, is the same for the input and the output of the transformer, and for feedforward line 20 that determines the time of switching of switches 35 and 37.

When switch 35 is on and switch 37 is off (FIG. 3), energy is transferred to inductor 23 and current flows from switch 35 through inductor 23 to capacitor 25. Volts 1 rises in this cycle. When switch 37 is on and switch 35 is off, current flows in the opposite direction, from capacitor 25 through inductor 23 to switch 41 to ground volts1 decreases in this cycle. Thus with the active feedback loop described here, volts1 can be tightly regulated for a wide variety of output loads.

Synchronous buck converter 21 described above has theoretical efficiency of from about 90% to about 95%, so, in combination with a forward design architecture, the overall power supply architecture in the embodiment of the present invention represented by FIG. 1 has an overall efficiency of greater than 85%.

The power supply architecture described above as an embodiment of the present invention provides much improved efficiency and a unique ability to implement many components in silicon, as an application specific integrated circuit (ASIC). The architecture of the embodiment described therefore affords advantages of low cost, low component count, and small component size. However, utilizing regulation of the primary side of transformer 19, only one output voltage can be tightly regulated, since the duty cycle of the voltage pulse train into transformer 19 is optimized for volts1.

There are low-cost applications that require only an efficient single dc output voltage, and the embodiment thus far described would be suitable for such an application. However, to meet multiple output voltage requirements, such as those required for most general-purpose computer systems, the present invention can be extended in another embodiment into an architecture that can accommodate multiple dc outputs of different voltages, with the magnitude of each output precisely regulated. Moreover, the extension may be accomplished without the unnecessary cost of a power rail.

In an alternative embodiment to retain high efficiency and precise regulation for multiple outputs, the general design of synchronous buck converter 21 and forward design architecture are not altered. Instead, feedback paths are modified.

Figure 6:
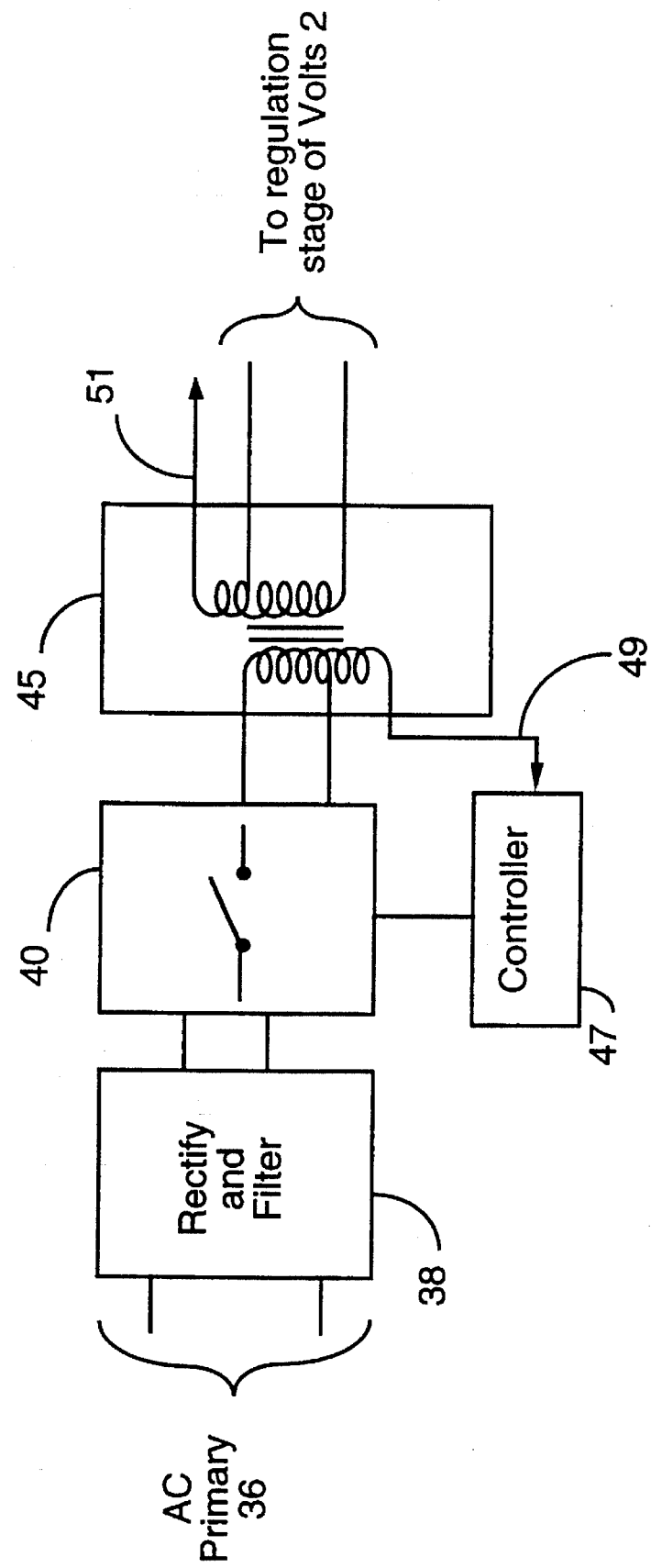
FIG. 6 is a schematic of the step-down stage of a power supply according to an embodiment of the invention providing multiple output voltages.

FIG. 6 is a schematic of the front half of a power supply architecture in an embodiment of the invention for multiple outputs that accomplishes step-down of input ac line voltage at primary input 36. Input ac line voltage 36, rectifying and filtering circuit 38, and switching circuit 40 may be the same as the equivalent components of the embodiment shown in FIG. 1. In the embodiment of FIG. 6, the voltage pulse train generated at the primary of transformer 45 is sampled and fed back to controller 47 via feedback path 49. This sampling is accomplished by a tap on transformer 45 at a higher winding count than the input winding from switch 40.

With the sampled voltage pulse train on path 49, controller 47 regulates switch 40 to control the frequency and duty cycle of the voltage pulse train at the primary of transformer 45. This loop is self-regulating independent of output voltage(s) and is set to produce a voltage pulse train of fixed duty cycle and frequency to the transformer primary.

Figure 7:
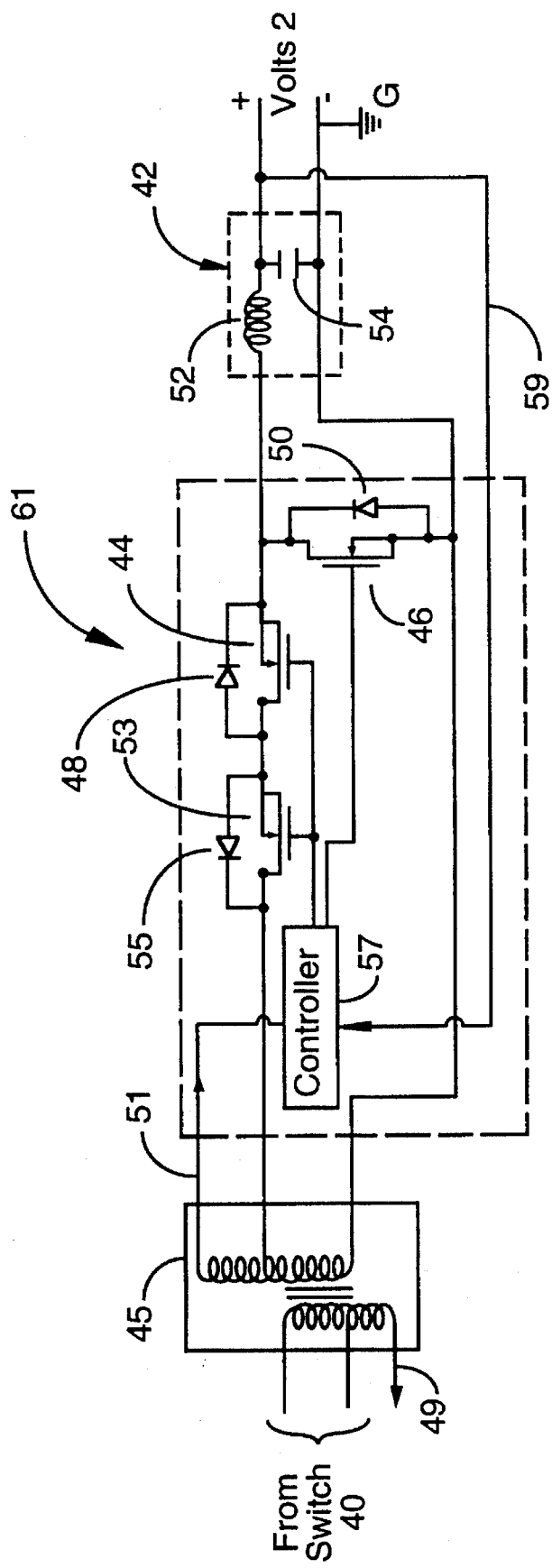
FIG. 7 is a schematic of the regulation stage of a power supply according to an embodiment of the invention providing multiple output voltages, and featuring an alternative synchronous buck converter.

FIG. 7 is a schematic of a rectification and regulation stage for the embodiment for which the front half is shown in FIG. 6. Storage and filter block 42 may be the same as the equivalent circuitry in FIGS. 1 and 3, and synchronous buck converter 61 is a modified version of synchronous buck converter 21 of FIGS. 1 and 3. Feedforward line 51 provides the same function as feedforward line 20 in FIGS. 1 and 3, providing input for controller 57 to synchronize and operate FET switches 44 and 46, having parasitic diodes 48 and 50 respectively.

Synchronous buck converter 61 is operationally equivalent to synchronous buck converter 21 in FIGS. 1 and 3. The only modifications are the addition of an FET switch 53 and associated parasitic diode 55. In this embodiment, synchronous rectification is performed by the combination switch made up of switches 53 and 44, and regulation of output volts2 is accomplished by the combination of switches 53, 44 and 46. The cycle of switches 53 and 44 is alternated with switch 46.

In this embodiment, to accomplish voltage regulation, volts2 is sampled and fed back to controller 57 in synchronous buck converter 61 through feedback path 59. The input side is no longer regulated by the output. With the sampled output, controller 57 controls the duty cycles of switch 53 and 44 combination and switch 46, selectively varying the amount of energy transferred to inductor 52.

Controller 57 is synchronized in frequency with controller 47 in FIG. 6. Because of this, the addition of switch 53 and associated parasitic diode is necessary for proper operation of the synchronous rectification. There is a situation where the voltage pulse train controlled by switch 40 and controller 47 is in a positive cycle which is coupled through to the secondary of transformer 45, and switches 53 and 44 are off and switch 46 is on for volts2 regulation requirements. If switch 53 were not there, just like the situation in synchronous buck converter 21, parasitic diode 48 would turn on, shunting energy to ground through switch 46. In this case, power would dissipate across parasitic diode 48, degrading the efficiency of the power supply. The addition of switch 53 and parasitic diode 55 prevents this situation from occurring. Parasitic diode 55 is connected in reverse to parasitic diode 48 and acts like a blocking diode in this situation, preventing current flow through parasitic diode 48.

This embodiment of synchronous buck converter 61 still takes full advantage of IC technology. The three FET switches 53, 44 and 46, along with controller 57, can still be fabricated on a single IC and assembled in a single package.

Figure 8:
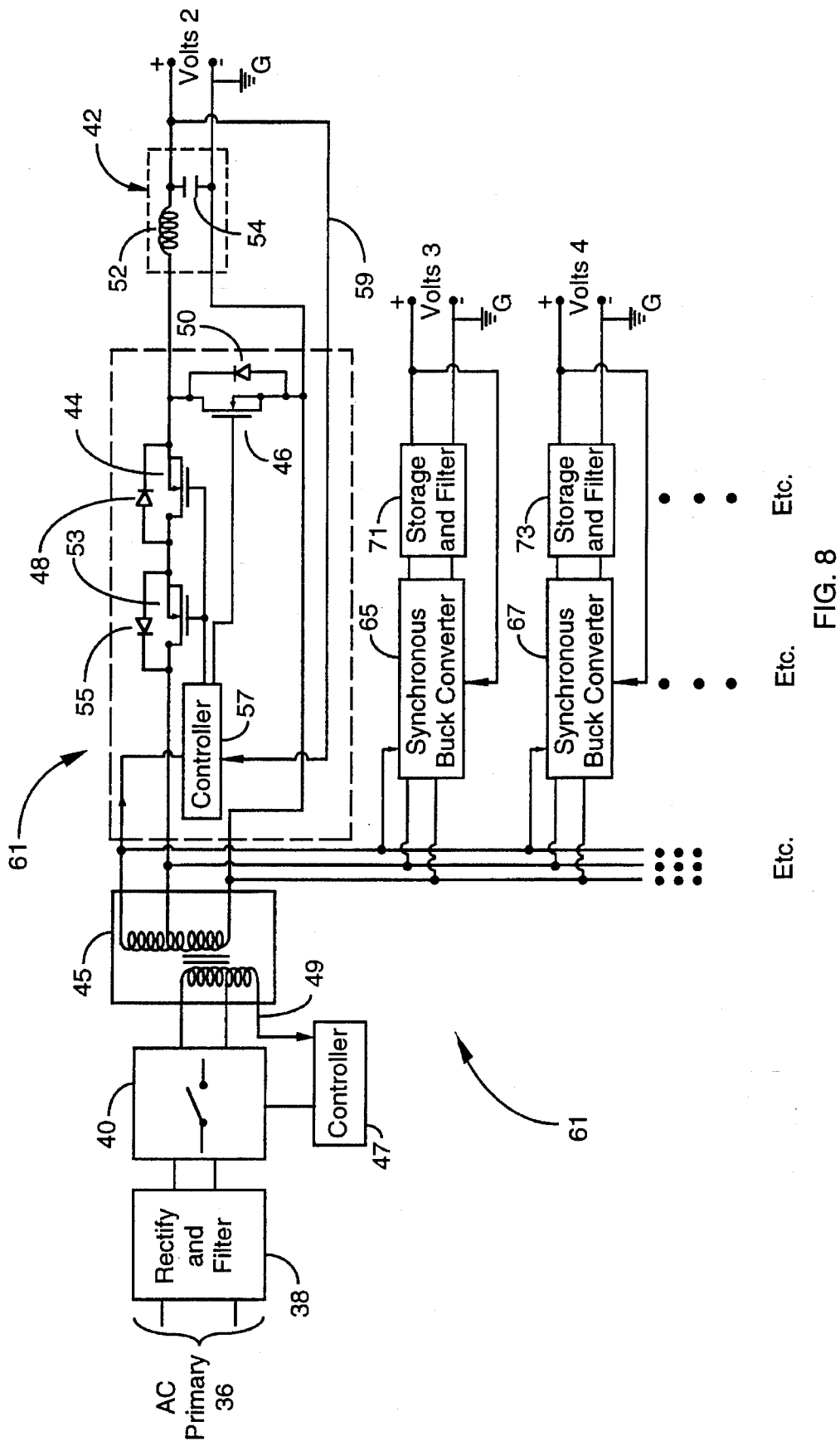
FIG. 8 is a schematic of a high-efficiency power supply according to an embodiment of the invention, providing multiple output voltages.

Controller 57 allows for implementation of multiple dc output voltages all driven from a single transformer 45 by replicating synchronous buck converters and storage and filter circuitry. FIG. 8 is a schematic block diagram of an embodiment of a high-efficiency power supply system 63 according to the invention with multiple dc output voltages of different magnitude. Additional synchronous buck converters 65 and 67 and additional storage and filter circuits 71 and 73 are added to produce dc outputs volts3 and volts4. Power supply 63 does not utilize a power rail, and no output voltage is wasted. Only output voltages of required voltage levels are produced. Furthermore, since controllers in all the synchronous buck converter blocks are synchronized in frequency with controller 47, no beat frequency can develop which can cause a possible instability in the power supply system.

Another advantage of using FET switches is that they can be easily controlled. The gates to switches 53 and 44 of synchronous buck converter 61 in FIG. 8 can be accessed through controller 57 by other control functions in the computer system (or other equipment) to enable or disable individual ones of outputs, providing even further overall efficiency in combination with power management systems, such as sleep circuits in notebook computers. By turning off switches 53 and 44 in synchronous buck converter 61, or the equivalent switches in any of the other synchronous buck converters, the corresponding output dc voltages are forced to zero, and no power is consumed or dissipated by the circuit or the load.

Figure 9:
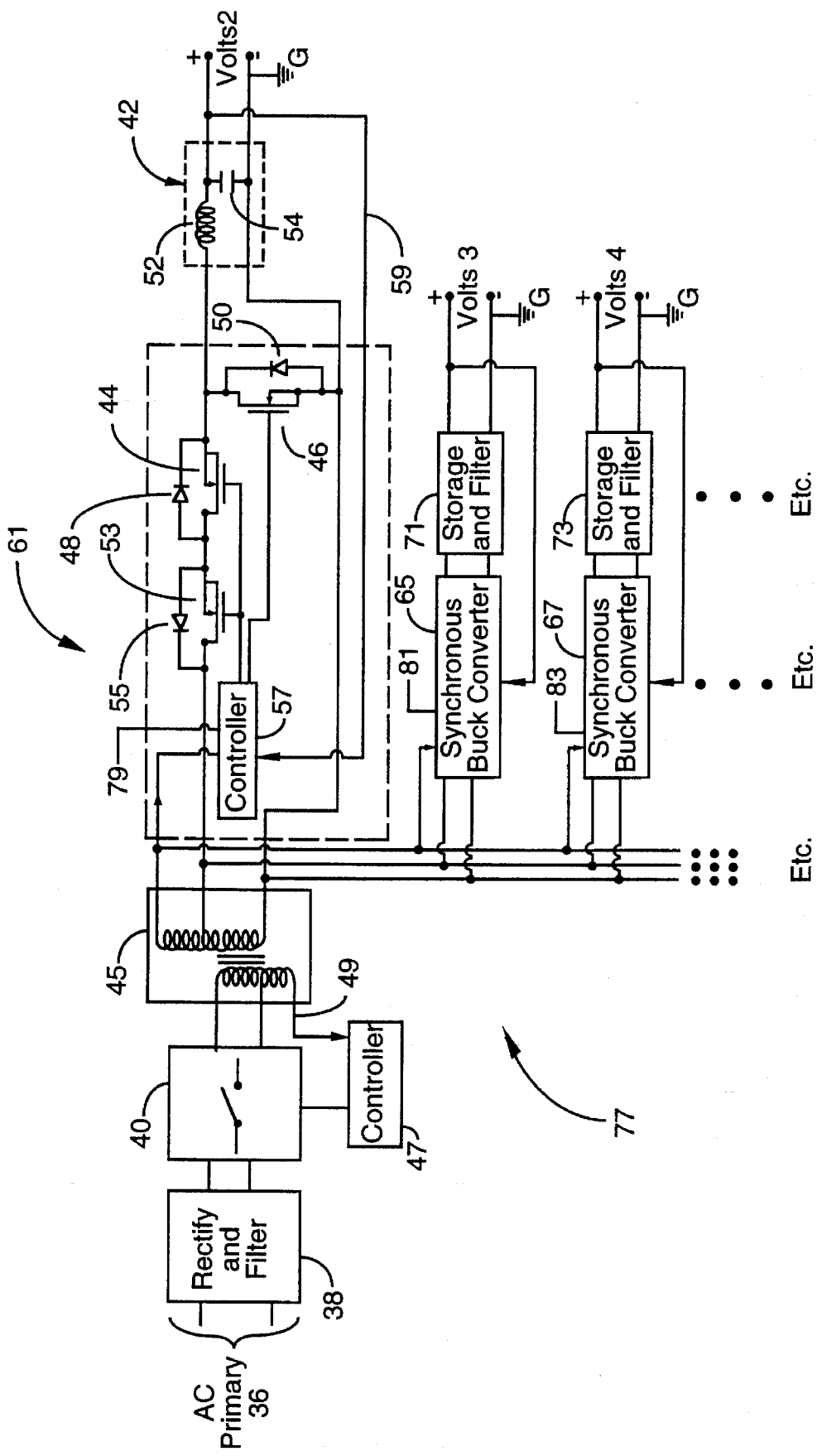
FIG. 9 is a schematic of a high-efficiency power supply according to an embodiment of the invention, with multiple output voltages and independent enable/disable control lines.

FIG. 9 is a block diagram of a high efficiency power supply system 77 according to an embodiment of the present invention, providing multiple dc output voltages and individual output voltage enable/disable controls. Control lines 79, 81 and 83 supply the enable/disable function to the controllers of the corresponding synchronous buck converters.

It will be apparent to those with skill in the art that there are many changes that might be made without departing from the spirit and scope of the invention. For example, the FET switches used in the embodiments in FIGS. 1, 8 and 9 are convenient rather than limiting. There are other solid state or mechanical devices that could be substituted for those selected. As another example, the forward design architecture used in the embodiments shown in FIGS. 1, 8 and 9 is not the only type of input ac line chopping and step-down scheme that will accomplish the purpose. As a further example, the FET switches used in the embodiments shown in FIGS. 1, 8 and 9 need not be connected exactly as shown to accomplish the purpose. For example, they can be paralleled in discrete or IC fashion to further improve on the overall efficiency of the power supply architecture. There are a variety of ways the resulting circuitry may be implemented, providing a package less expensive to manufacture, more compact and much more flexible and controllable than conventional power supplies.

What is claimed is:

1. A circuit adapted for rectifying an alternating current (ac) waveform, comprising:

a first input terminal and a second input terminal across which the ac waveform is applied;

a first output terminal and a second output terminal across which the rectified result is provided;

a third input terminal adapted for monitoring frequency of the ac waveform;

a first field-effect transistor (FET) switch connected between the first input terminal and the first output terminal, and having a parallel parasitic diode with conduction direction toward the first output terminal;

a second FET connected on one side to the first output terminal and on the other side to the second input terminal and the second output terminal, and having a parallel parasitic diode with conduction direction toward the side connected to the first output terminal; and a controller connected to the switching inputs of the first and second FETs and to the third input terminal, the controller adapted for switching the first and second FETs on and off in opposite state to one another and synchronously with a frequency applied at the third input terminal.

2. A circuit as in claim 1 implemented as an application-specific integrated circuit.

3. A circuit as in claim 1 further comprising a storage and filtering circuit connected across the first and second output terminals and having third and forth output terminals providing a direct current (dc) output.

4. A circuit as in claim 3 implemented as an application-specific integrated circuit (ASIC).

5. A power supply for providing a regulated direct current (dc) output from a first alternating current (ac) waveform, comprising:

rectifying and filtering circuitry connected to the ac primary for producing an unregulated dc voltage;

input switching circuitry connected to the output of the rectifying and filtering circuitry, and adapted for providing a second ac waveform at a higher frequency than the first ac waveform;

a step-down transformer with a primary winding connected to receive the second ac waveform from the input switching circuitry, and a secondary winding;

a rectifying circuit connected to the secondary winding of the transformer by a first and a second terminal and a first and a second output terminal;

a storage and filter circuit connected to the output of the rectifying circuit and having third and fourth output terminals for providing a regulated DC voltage; and a first controller connected to the third output terminal of the storage and filter circuit and to the input switching circuitry, adapted for regulating the output voltage by controlling the duty cycle of the input switching circuitry;

wherein the rectifying circuit comprises:

a first input terminal and a second input terminal connected to the secondary winding of the transformer;

a first output terminal and a second output terminal providing output to the storage and filtering circuitry;

a third input terminal connected to the secondary winding of the transformer at a higher voltage than that supplied to the rectifying circuit;

a first field-effect transistor (FET) switch connected between the first input terminal and the first output terminal, and having a parallel parasitic diode with conduction direction toward the first output terminal;

a second FET connected on one side to the first output terminal and on the other side to the second input terminal and the second output terminal, and having a parallel parasitic diode with conduction direction toward the side connected to the first output terminal; and a controller connected to the switching inputs of the first and second FETs and to the third input terminal, the controller adapted for switching the first and second FETs on and off in opposite state to one another and synchronously with a frequency applied at the third input terminal.

6. A power supply as in claim 5 wherein all circuitry after the transformer is implemented as an application-specific integrated circuit (ASIC).

7. A circuit adapted for rectifying an alternating current (ac) waveform, and for converting the rectified result to a lower voltage than the root mean square (RMS) amplitude of the ac waveform, comprising:

a first input terminal and a second input terminal across which the ac waveform is applied;

a first output terminal and a second output terminal across which the rectified result is provided;

a third input terminal adapted for monitoring frequency of the ac waveform;

a fourth input terminal for monitoring voltage of a dc output;

first and a second field-effect transistor (FET) switches connected in series between the first input terminal and the first output terminal, each having parallel parasitic diodes with opposite conduction direction;

a third FET connected on one side to the first output terminal and on the other side to the second input terminal and the second output terminal, and having a parallel parasitic diode with conduction direction toward the side connected to the first FET; and a controller connected to the switching inputs of the first and second FETs, to the third input terminal, and to the fourth input terminal, the controller adapted for switching the first and second FETs on and off simultaneously and in opposite state to the third FET, synchronously with a frequency applied at the third input terminal, and adapted for controlling the duty cycle of the switching.

8. A circuit as in claim 7 implemented as an application-specific integrated circuit.

9. A circuit as in claim 7 further comprising a storage and filtering circuit connected across the first and second output terminals and having third and forth output terminals providing a direct current (dc) output.

10. A circuit as in claim 9 implemented as an application-specific integrated circuit (ASIC).

11. A power supply for providing a regulated direct current (dc) output from a first alternating current (ac) waveform, comprising:

rectifying and filtering circuitry connected to the ac primary for producing an unregulated dc voltage;

input switching circuitry connected to the output of the rectifying and filtering circuitry, and adapted for providing a second ac waveform at a higher frequency than the first ac waveform;

a step-down transformer with a primary winding connected to receive the second ac waveform from the input switching circuitry, and a secondary winding;

a rectifying and conversion circuit connected to the secondary winding of the transformer by a first and a second input terminal and having a first and a second output terminal; and a storage and filter circuit connected to the output of the rectifying and conversion circuit and having third and fourth output terminals for providing a regulated DC voltage;

wherein the rectifying and conversion circuit comprises:

a first input terminal and a second input terminal connected to the secondary winding of the transformer;

a first output terminal and a second output terminal providing output to the storage and filtering circuitry;

a third input terminal connected to the secondary winding of the transformer at a higher voltage than that supplied to the rectifying circuit;

first and a second field-effect transistor (FET) switches connected in series between the first input terminal and the first output terminal, each having parallel parasitic diodes with opposite conduction direction;

a third FET connected on one side to the first output terminal and on the other side to the second input terminal and the second output terminal, and having a parallel parasitic diode with conduction direction toward the side connected to the first FET; and a controller connected to the switching inputs of the first, second, and third FETs, to the third input terminal, and to the output of the storage and filter circuitry, the controller adapted for switching the first and second FETs on and off simultaneously and in opposite state to the third FET, synchronously with a frequency applied at the third input terminal, and adapted for controlling the duty cycle of the switching according to the output of the storage and filter circuitry.

12. A power supply as in claim 12 wherein the elements after the transformer are implemented as an application-specific integrated circuit.

13. A power supply as in claim 11 wherein the elements after the transformer comprise a first rectifying and conversion stage, and additionally comprising further rectifying and conversion stages, wherein separate rectifying and conversion stages are controlled to provide distinct regulated DC voltages.

14. A power supply as in claim 13 wherein each rectifying and conversion stage is implemented as an application-specific integrated circuit (ASIC).

15. A power supply as in claim 13 wherein all rectifying and conversion stages are implemented as a single application-specific integrated circuit (ASIC).

16. A power supply as in claim 13 wherein separate controllers in the separate rectifying and conversion stages each further comprise an enable/disable input whereby individual ones of the rectifying and conversion stages may be enabled and disabled.

* * * * *